(12) United States Patent
Hyun et al.

(10) Patent No.: US 11,366,533 B2
(45) Date of Patent: Jun. 21, 2022

(54) FOUR-DIMENSIONAL TOUCH PAD MODULE

(71) Applicant: BLD CO., LTD, Seoul (KR)

(72) Inventors: Euy Sub Hyun, Seoul (KR); Tae Hoo Jung, Seoul (KR)

(73) Assignee: BLD CO., LTD, Seoul (KR)

( * ) Notice: Subject to any disclaimer, the term of this patent is extended or adjusted under 35 U.S.C. 154(b) by 0 days.

(21) Appl. No.: 17/604,204

(22) PCT Filed: Apr. 17, 2020

(86) PCT No.: PCT/KR2020/005130
§ 371 (c)(1),
(2) Date: Oct. 15, 2021

(87) PCT Pub. No.: WO2020/213966
PCT Pub. Date: Oct. 22, 2020

(65) Prior Publication Data
US 2022/0147167 A1 May 12, 2022

(30) Foreign Application Priority Data

Apr. 17, 2019 (KR) .......................... 10-2019-0044783

(51) Int. Cl.
*G06F 3/041* (2006.01)
*G06F 3/0354* (2013.01)
*G06F 3/08* (2006.01)

(52) U.S. Cl.
CPC ............ *G06F 3/03547* (2013.01); *G06F 3/08* (2013.01)

(58) Field of Classification Search
CPC .............................. G06F 3/03547; G06F 3/08
See application file for complete search history.

(56) References Cited

U.S. PATENT DOCUMENTS

| 2010/0026626 | A1* | 2/2010 | Macfarlane | G06F 3/0213 |
| | | | | 345/157 |
| 2011/0063230 | A1* | 3/2011 | Mazur | G10H 1/0091 |
| | | | | 345/173 |
| 2014/0043272 | A1* | 2/2014 | Okumura | G06F 3/016 |
| | | | | 345/173 |

FOREIGN PATENT DOCUMENTS

| CN | 107782061 | A | * | 3/2018 |
| CN | 207115366 | U | * | 3/2018 |
| JP | 2009-199729 | A | | 9/2009 |
| KR | 10-2013-0019590 | A | | 2/2013 |

(Continued)

OTHER PUBLICATIONS

International Search Report for PCT/KR2020/005130 dated, Aug. 6, 2020 (PCT/ISA/210).

(Continued)

*Primary Examiner* — Joe H Cheng
(74) *Attorney, Agent, or Firm* — Sughrue Mion, PLLC

(57) ABSTRACT

Disclosed is a four-dimensional touch pad module including a touch pad, a division boundary layer divided into a center touch pad area and respective side touch pad areas; a side button for performing a corresponding side button function by pressing a side touch pad, an FPCB having a touch pad FPCB connection part and a side button contact point respectively formed thereon, and an upper/lower housing, enabling short-distance pointing to be performed alone via the center touch pad and enabling long-distance pointing to be performed in parallel via a combination of the center touch pad and the side touch pad.

13 Claims, 9 Drawing Sheets

(56) References Cited

FOREIGN PATENT DOCUMENTS

| KR | 10-2013-0097986 A | 9/2013 |
| KR | 10-1425949 B1 | 8/2014 |
| KR | 10-1845975 B1 | 5/2018 |
| KR | 10-2018-0126923 A | 11/2018 |
| KR | 20200119643 A * | 10/2020 |

OTHER PUBLICATIONS

Written Opinion of the International Searching Authority for PCT/KR2020/005130 dated, Aug. 6, 2020 (PCT/ISA/237).

* cited by examiner

FOUR-DIMENSIONAL TOUCH PAD MODULE

CROSS REFERENCE TO RELATED APPLICATIONS

This application is a National Stage of International Application No. PCT/KR2020/005130 filed Apr. 17, 2020, claiming priority based on Korean Patent Application No. 10-2019-0044783 filed Apr. 17, 2019, the entire disclosures of which are incorporated herein by reference.

TECHNICAL FIELD

The present disclosure relates to an advanced cutting-edge four-dimensional touch pad module which is capable of providing a touch pad having an area smaller than that of the touch pad of the related art by fusing advantages of a mouse and a touch pad of the related art and changing a configuration and a structure of the related art while resetting an operating principle and doubles an efficiency and a convenience by allowing additional functions to be performed as well as the function of the related art while maintaining a touch pad UI operating method of the related art even though a touch pad with a very small size is provided. More particularly, the present disclosure relates to a four-dimensional touch pad module which enables short-distance pointing to be performed alone via a center touch pad and enables long-distance pointing to be performed in parallel via a combination of the center touch pad and a side touch pad.

BACKGROUND ART

Recently, a control signal input device equipped with various buttons to remotely control a smart device such as a smart phone, a tablet, or an IPTV by utilizing a function of a mouse or a keyboard is being used.

As the related art thereof, Korean Registered Patent Publication No. 1425949 is disclosed. A sliding type signal input device of the related art includes a housing, a slide button seated in an inner space of the housing, a flexible printed circuit board which is coupled to enclose any one of an inner wall of the inner space and an outer sidewall of the slide button and includes two or more terminal switches, and a conductor which is provided to enclose the other one of the inner wall of the inner space and the out sidewall of the slide button to come into contact with the terminal switch as the slide button moves in a lateral direction to connect the terminal switch. By doing this, different types of input signal are generated depending on a direction of an operating force for sliding in a lateral direction to reduce the number of buttons provided in the signal input device. Further, even though a separate pressure sensor is not provided, the operating force to slide in a lateral direction is detected so that the configuration may be simplified.

However, the flexible printed circuit board and the terminal switches are vertically formed on the inner wall so that there is a limit to manufacture an ultra-thin mouse due to a wiring structure. Further, a difficulty of the bonding task on a curved inner wall of the flexible printed circuit board is high to lower a working efficiency and increase a defect rate. Further, the flexible printed circuit board is separated due to the frequent contact with the terminal switch and the temperature change, which increases a possibility of an erroneous operation to degrade a product durability. As a result, even though the long-distance pointing is possible, the precise short-distance pointing cannot be performed and the function of the mouse is performed only by installing an auxiliary button, so that there is a problem in that a practicality and a value of the appearance of the product are lowered.

DISCLOSURE

Technical Problem

A technical object to be achieved by the present disclosure is to provide a four-dimensional touch pad module which is manufactured to be ultra-thin, performs short-distance and long-distance precise pointing on a touch pad with a very small area, and allows the touch pad to perform various additional functions to improve the practicality and the efficiency.

In order to achieve the above-described object, according to a first aspect of the present disclosure, a four-dimensional touch pad module includes a disk-shaped touch pad which recognizes a coordinate to perform pointing; a division boundary layer which is formed above the touch pad and is configured by a ring-shaped first division boundary layer which divides an upper portion of the touch pad into a circular center touch pad and a side touch pad and a linear second division boundary layer which individually divides the side touch pad in an arc shape; a side button which has a through hole formed on a center area through which a touch pad wiring line passes and divides an outside area while accommodating the touch pad so as to expose an upper portion of the touch pad to perform a side button function by pressing the side touch pad; a FPCB which has a touch pad FPCB connection part formed in a center area to which the touch pad wiring line is connected and two or more side button contact points which are radially disposed at an outside area corresponding to the side button to be electrically connected by pressing the side button; and upper/lower housings in which the division boundary layer, the touch pad, the side button, and the FPCB are sequentially laminated to be accommodated therein, in which short-distance pointing is performed only by the center touch pad and long-distance pointing is performed in parallel by a combination of the center touch pad and the side touch pad, in the case of the long-distance pointing, a touch response sensitivity is stored when reaching the corresponding side touch pad after starting the touch of the center touch pad and the movement continues according to the touch response sensitivity even without repeated touch while the touch is maintained after reaching the side touch pad so that the long-distance pointing of a desired pointing coordinate when the touch is released after reaching a desired pointing coordinate is performed to perform the unlimited long-distance pointing as long as desired even with a very small area of the touch pad.

Technical Solution

In the meantime, according to a second aspect of the present disclosure, a four-dimensional touch pad module includes a disk-shaped center touch pad which recognizes a coordinate to perform pointing; a center touch pad housing which has a through hole formed in a center area through which a center touch pad wiring line passes and accommodates the center touch pad so as to expose an upper portion of the center touch pad; two or more side touch pads which are divided to be formed in an arc shape at an outside to be spaced apart from the center touch pad; a side button which formed below the side touch pad to correspond thereto, has a through hole through which a side touch pad wiring line passes, and performs a side button function by pressing the side touch pad; a FPCB which has a center touch pad FPCB connection part formed in a center area to which the center touch pad wiring line is connected, a side touch pad FPCB connection part at one side of the outside area to which the side touch pad wiring line is connected, and two or more side button contact points which are radially disposed at the other side of the outside area corresponding to the side button to be electrically connected by pressing the side button; an upper housing in which a division boundary layer configured by a ring-shaped first division boundary layer which divides the center touch pad and the side touch pad and a linear second division boundary layer which individually divides the side touch pad in an arc shape is formed at an upper end and the center touch pad, the side touch pad, the center touch pad housing, the side button, and the FPCB are sequentially laminated to be accommodated; and a lower housing formed to be opposite to the upper housing, in which short-distance pointing is performed only by the center touch pad and long-distance pointing is performed in parallel by a combination of the center touch pad and the side touch pad, in the case of the long-distance pointing, a touch response sensitivity is stored when reaching the corresponding side touch pad after starting the touch of the center touch pad and the movement continues according to the touch response sensitivity even without repeated touch while the touch is maintained after reaching the side touch pad so that the long-distance pointing of a desired pointing coordinate when the touch is released after reaching a desired pointing coordinate is performed to perform the unlimited long-distance pointing as long as desired even with a very small area of the touch pad.

Here, the side touch pad and the side button are divided by the second division boundary layer into four side touch pads of STU, STD, STL, and STR and four side buttons of SBU, SBD, SBL, and SBR with the same interval, respectively.

Further, various functions of a graphic controller are performed by one or a specific combination of the center touch pad, the side touch pad, and the side button.

Further, the division boundary layer is set to have a height of 0.5 mm to 1.0 mm enough to recognize a boundary and easily cross the boundary while touching during the interworking by a specific combination.

Further, a right-click function may be performed by touch of the STR.

Further, vertical scrolling is performed by up-down touch of the STL or the STR and horizontal scrolling is performed by left-right touch of the STU or the STD.

Further, a vacuum suction plate or an attachment pad is formed on a bottom surface of the lower housing to be attached to a mouse, a smart phone, a smart phone case, a tablet, a notebook computer, or a remote controller to perform a touch pad function wirelessly or by being connected to the circuit line of the FPCB through a wire.

Further, the four-dimensional pad module is embedded in the mouse, the smart phone, the smart phone case, the tablet, the notebook computer, or the remote controller to be integrally formed to perform a touch pad function.

Further, the short-distance pointing or fine control is performed by the touch of the center touch pad and a drag and drop function is performed by a combination of the double-click of the center touch pad and the side touch pad.

Further, go-back is performed by click of the SBU, go-home is performed by double-click, and short-cut is performed by long-press, mouse basic setting is performed by click of the SBD, android is used as a main platform by double-click, and iOS is used as a main platform by long-press, right-click is performed by click of the SBR and zoom-in is performed by long-press, left-click is performed by click of the SBL, double-click is performed by double click, and zoom-out is performed by the long-press.

Further, in a phone-call mode, the center touch pad is touched to answer the phone, is double-touched to hang up, and is long-pressed to perform the recording. In a photo mode, the center touch pad is touched to take a picture, is double-touched to perform "zoom-in", and is long-touched to perform "zoom-out".

Further, an additional function desired by a user is set by using the side touch pad alone or a combination by interworking with the other side button to be performed and 10 cases including four cases of click or double-click of only the side touch pad and six combinations formed by simultaneous click of the interworking side touch pad are generated, and 10 cases interwork to form a combination of click/double click/long press of the side button to allow the user to arbitrarily set 120 additional functions and remember the set combinations to set the function key of the keyboard and a function of the keyboard to be performed.

Advantageous Effects

According to the present disclosure, the short-distance pointing is performed alone by the center touch pad and the long-distance pointing is performed in parallel by the combination of the center touch pad and the side touch pad.

Further, the pointing function is performed in a fixed space without physical movement to overcome a spatial restriction.

Further, a single operation or a combined operation of a divided touch pad and a side button provides various additional functions which cannot be provided by the touch pad of the related art.

Further, it is possible to be attached without feeling of rejection or difference or embedded in a device itself with various shapes without size limitation to be integrated to be used in a wired manner or a wireless manner.

Further, a touch pad having an area smaller than that of the touch pad of the related art may be provided by fusing advantages of a mouse and a touch pad of the related art and changing a configuration and a structure of the related art while resetting an operating principle and an efficiency and a convenience may be doubled by allowing additional functions to be performed as well as the function of the related art while maintaining a touch pad UI operating method of the related art even though a touch pad with a very small size is provided.

Moreover, the touch pad is formed to have ultra-thin thickness to be manufactured with a single configuration which is externally combined in association with an overall design of various smart devices to which a touch pad function is applicable.

MODES OF THE INVENTION

Figure 1:
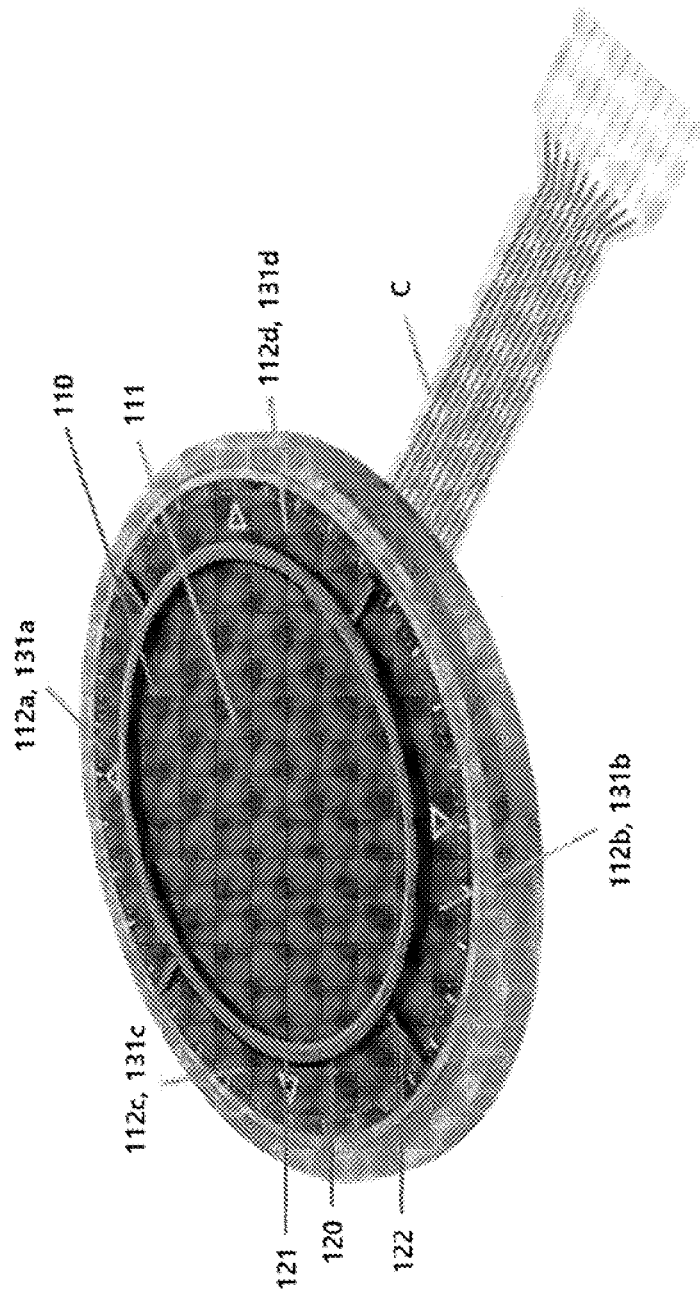
FIG. 1 is a perspective view of a four-dimensional touch pad module according to a first exemplary embodiment of the present disclosure.

Hereinafter, embodiments of the present invention having the above-described features will be described in more detail with reference to the accompanying drawings.

Referring to FIGS. 1 to 4, a four-dimensional touch pad module according to the first exemplary embodiment of the present disclosure includes a touch pad 110, a division boundary layer 120 divided into a center touch pad area and respective side touch pad areas, a side button 130 which performs a side button function by pressing side touch pads 112a, 112b, 112c, and 112d, an FPCB 140 having a touch pad FPCB connection part 141 and a side button contact point 142 formed thereon, and upper/lower housings 150 and 160 as a whole. The short-distance pointing is performed only by a center touch pad 111 and the long-distance pointing is performed in parallel by a combination of the center touch pad 111 and the side touch pads 112a, 112b, 112c, and 112d. In the case of the long-distance pointing, a touch response sensitivity when the touch starts from the center touch pad 111 and then reaches the corresponding side touch pads 112a, 112b, 112c, and 112d is stored. Therefore, the movement continues according to the stored touch response sensitivity even without repeated touches while the touch is maintained after reaching the side touch pads 112a, 112b, 112c, and 112d so that when the touch reaches a desired pointing coordinate, and then is released, the long-distance pointing of a desired pointing coordinate is performed, thereby performing unlimited long-distance pointing as long as desired even with the very small area of the touch pad 110.

Figure 2:
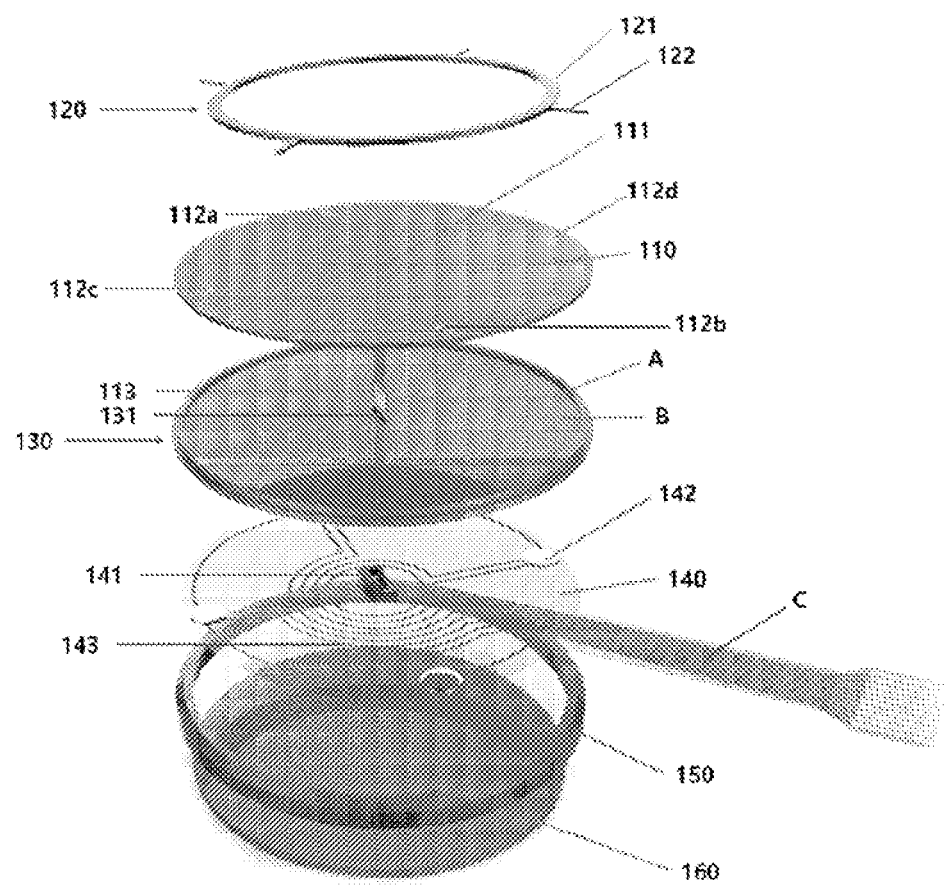
FIG. 2 is an exploded perspective view of a four-dimensional touch pad module of FIG. 1.

First, as illustrated in FIGS. 1 and 2, the touch pad 110 is formed to have a disk shape and recognizes a pointing coordinate by touch of the touch sensor (not illustrated) to perform the pointing.

For example, the touch pad 110 may be configured to be divided into a center touch pad 111 which performs the short-distant pointing alone and side touch pads 112a, 112b, 112c, and 112d which performs long-distance pointing and various basic functions of the touch pad and additional functions which are not provided by the touch pad of the related art in parallel.

Here, the side touch pads 112a, 112b, 112c, and 112d are configured to be divided by a second division boundary layer 122 to be described below into four side touch pads corresponding to side touch up (STU) 112a, side touch down (STD) 112b, side touch left (STL) 112c, and side touch right (STR) 112d, with the same interval.

In the meantime, to be more specific, the long-distance pointing is designed such that a touch response sensitivity is stored when the touch reaches the side touch pads 112a, 112b, 112c, and 112d after starting the touch of the center touch pad 111 and the movement continues according to the stored touch response sensitivity even without repeated touches while the touch is maintained after reaching the side touch pads 112a, 112b, 112c, and 112d. Therefore, when the touch is released after reaching a desired pointing coordinate, the long-distance pointing of the desired pointing coordinate is performed.

As descried above, a touch response sensitivity is stored when the touch reaches the side touch pads 112a, 112b, 112c, and 112d after starting the touch of the center touch pad 111 and unlimited movement is allowed according to the stored touch response sensitivity even without repeated touches while the touch is maintained after reaching the side touch pads 112a, 112b, 112c, and 112d so that the long-distance pointing for as long as desired may be efficiently and conveniently performed even with the very small area which is not comparable with the touch pad of the related art.

Next, the division boundary layer 120 is formed above the touch pad 110, as illustrated in FIGS. 1 and 2 and is configured by a ring-shaped first division boundary layer 121 which divides an upper area of the touch pad 110 into a circular center touch pad 111 and side touch pads 112a, 112b, 112c, and 112d at the outside and a linear second division boundary layer 122 which uniformly and individually divides the side touch pads 112a, 112b, 112c, and 112d in an arc shape.

Here, the division boundary layer 120 is set to have a height of 0.5 mm to 1.0 mm enough to recognize a boundary between the center touch pad 111 and the side touch pads 112a, 112b, 112c, and 112d and easily cross the boundary while touching during the interworking by a specific combination of the center touch pad 111 and the side touch pads 112a, 112b, 112c, and 112d for the long-distance pointing.

That is, the division boundary layer 120 divides the touch pad 110 to perform various subdivided functions and allow a user to easily recognize a physical boundary by the first division boundary layer 121 and the second division boundary layer 122 with a sense of touch of a finger to prevent an erroneous operation over a boundary of a selective function set for the center touch pad (CT, 111);

side button up (SBU) 131a, 132a, side button down (SBD) 131b, 132b, side button left (SBL) 131c, 132c, and side button right (SBR) 131d, 132d, and each side touch pad 112a, 112b, 112c, 112d.

Next, as illustrated in FIGS. 1 and 2, in the side button 130, a through hole 131 through which a touch pad wiring line 113 passes is formed in a center area and the side button serves as a housing A which accommodates the touch pad 110 to expose an upper portion of the touch pad 110. Further, an outside area thereof is divided by the second division boundary layer 122 to perform a side button function B by pressing the corresponding side touch pads 112a, 112b, 112c, and 112d.

Here, the side button 130 is configured to be divided by the above-described second division boundary layer 122 into four side buttons corresponding to side button up (SBU) 132a, side button down (SBD) 132b, side button left (SBL) 132c, and side button right (SBR) 132d, with the same interval.

In the meantime, only one or a specific combination of the center touch pad 111, the side touch pads 112a, 112b, 112c, and 112d, and the side button 130 may faithfully perform various functions such as a basic function as a graphic controller and additional functions.

Figure 3:
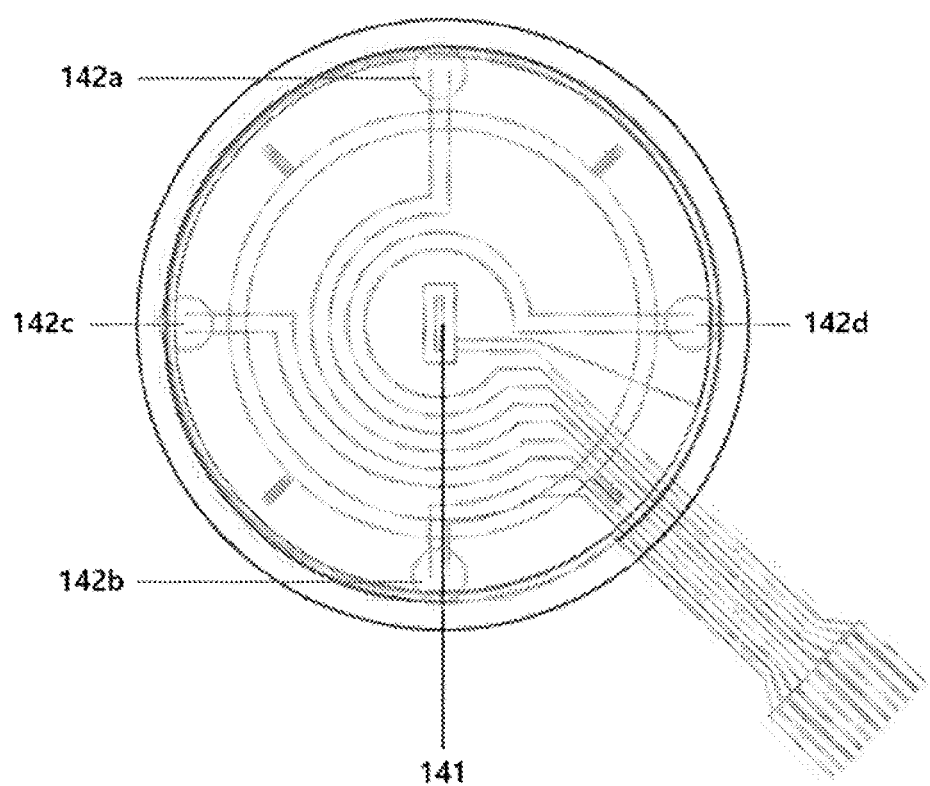
FIG. 3 is a wiring diagram of a FPCB of a four-dimensional touch pad module of FIG. 1.
Figure 4:
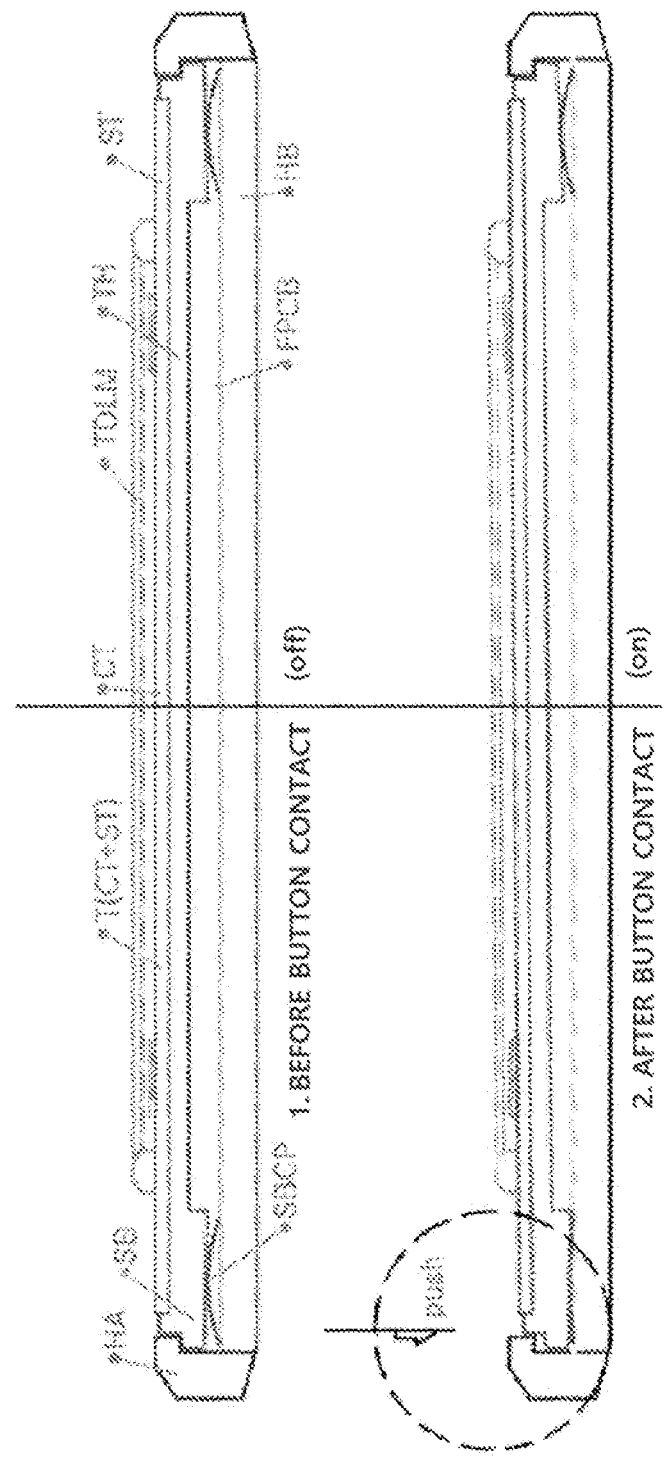
FIG. 4 illustrates a pressurization operation of a side button of a four-dimensional touch pad module of FIG. 1.

Next, as illustrated in FIGS. 2 to 4, in the FPCB 140, a touch pad FPCB connection part 141 to which the touch pad wiring line 113 is electrically connected is formed in a center area and two or more elastic side button contact points 142 which are radially disposed at an outside area corresponding to the side button 130 to be electrically connected by pressing the corresponding side button 130 are formed, respectively.

For example, as illustrated in FIG. 3, first to fourth side button contact points 142a, 142b, 142c, and 142d corresponding to the side buttons 130 of SBU 132a, SBD 132b, SBL 132c, and SBR 132d are formed, respectively.

Further, as illustrated in FIG. 4, one side button (SB; 132a, 132b, 132c, 132d) is pressed (pushed) to electrically conduct one corresponding side button contact point (SBCP; 142a, 142b, 142c, and 142d) to recognize click, double click, and long press of the side button SB.

Next, in the upper/lower housing (HA, 150) and (HB, 160), as illustrated in FIGS. 1 and 2, the division boundary layer 120, the touch pad 110, the side button 130, and the FPCB 140 are sequentially laminated to be accommodated therein.

Further, a circuit line C configured by the touch pad wiring line 113 and the side button wiring line 143 may be electrically connected to a connection terminal (not illustrated) of an external device by means of a connection groove (not illustrated) formed at one side of the upper housing 150 or the lower housing 160.

Accordingly, a configuration of the four-dimensional touch pad module of the first exemplary embodiment as described above allows the center touch pad to perform the short-distance pointing alone and a combination of the center touch pad and the side touch pad to perform the long-distance pointing in parallel and enables the pointing function in a fixed space without physical movement to overcome the spatial restriction. Further, various additional functions which are not provided by the touch pad of the related art are provided by a single operation and a combinational operation of the divided touch pads and side buttons. The touch pad is attached without feeling of rejection or difference or embedded in a device itself with various shapes without size limitation to be integrated to be used in a wired manner or a wireless manner. Further, the touch pad is formed to have ultra-thin thickness to be manufactured with a single configuration which is externally combined in association with an overall design of various smart devices to which a touch pad function is applicable.

Referring to FIGS. 5 to 8, a four-dimensional touch pad module according to a second exemplary embodiment of the present disclosure includes a center touch pad 110, a center touch pad housing 120 which accommodates the center touch pad 110, a side touch pad 125 which is formed to be divided at the outside of the center touch pad 110, a side button 130 which performs a side button function by pressing the side touch pad 125, an FPCB 140 having a center touch pad FPCB connection part 141, a side touch pad FPCB connection part 143a-143d and a side button contact point 142, and upper/lower housings 150 and 160 in which a division boundary layer 151 configured by a first division boundary layer 151a and a second division boundary layer 151b is formed, as a whole. The short-distance pointing is performed only by the center touch pad 110 and the long-distance pointing is performed in parallel by a combination of the center touch pad 110 and the side touch pad 125. In the case of the long-distance pointing, a touch response sensitivity when the touch starts from the center touch pad 110 and then reaches the corresponding side touch pad 125 is stored. Therefore, the movement continues according to the stored touch response sensitivity even without repeated touches while the touch is maintained after reaching the side touch pad 125 so that when the touch reaches a desired pointing coordinate, and then is released, the long-distance pointing of a desired pointing coordinate is performed, thereby performing unlimited long-distance pointing as long as desired even with the very small area of the center touch pad 110 and the side touch pad 125.

Figure 5:
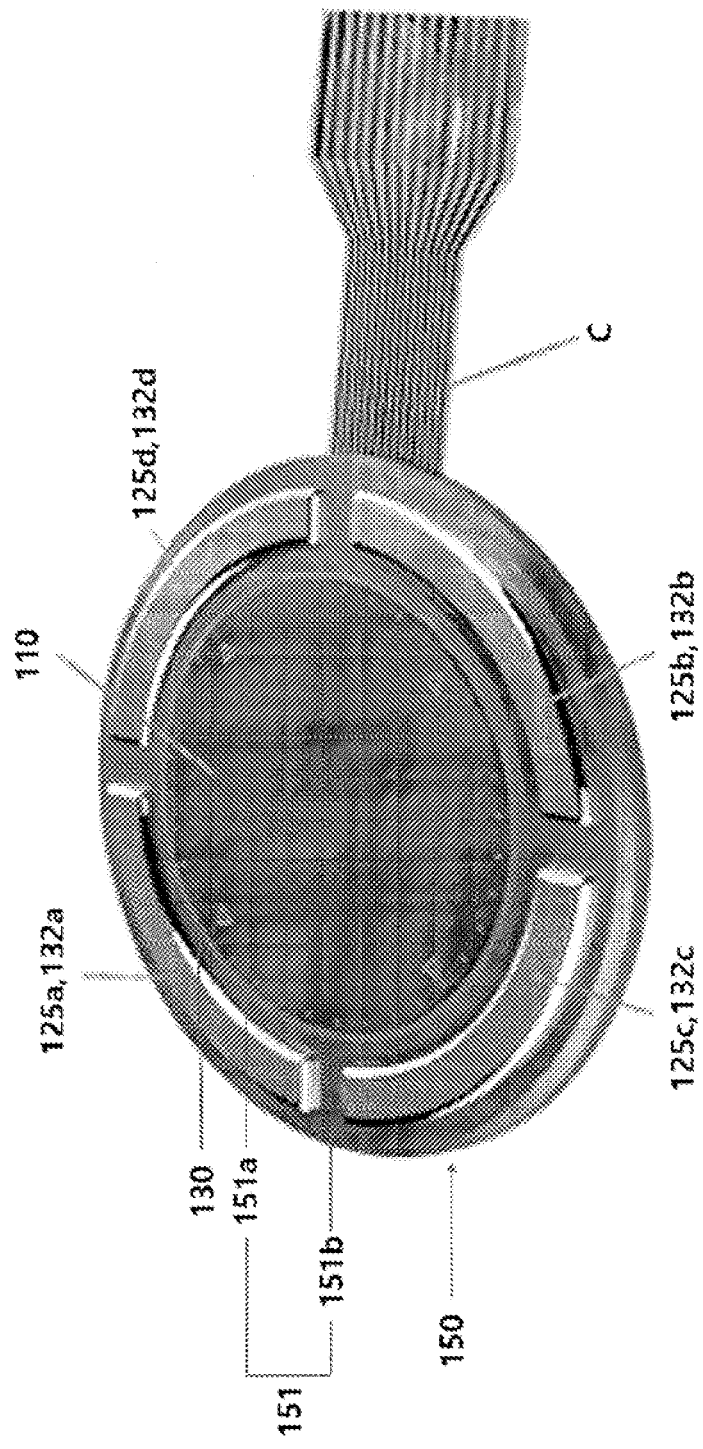
FIG. 5 is a perspective view of a four-dimensional touch pad module according to a second exemplary embodiment of the present disclosure.
Figure 6:
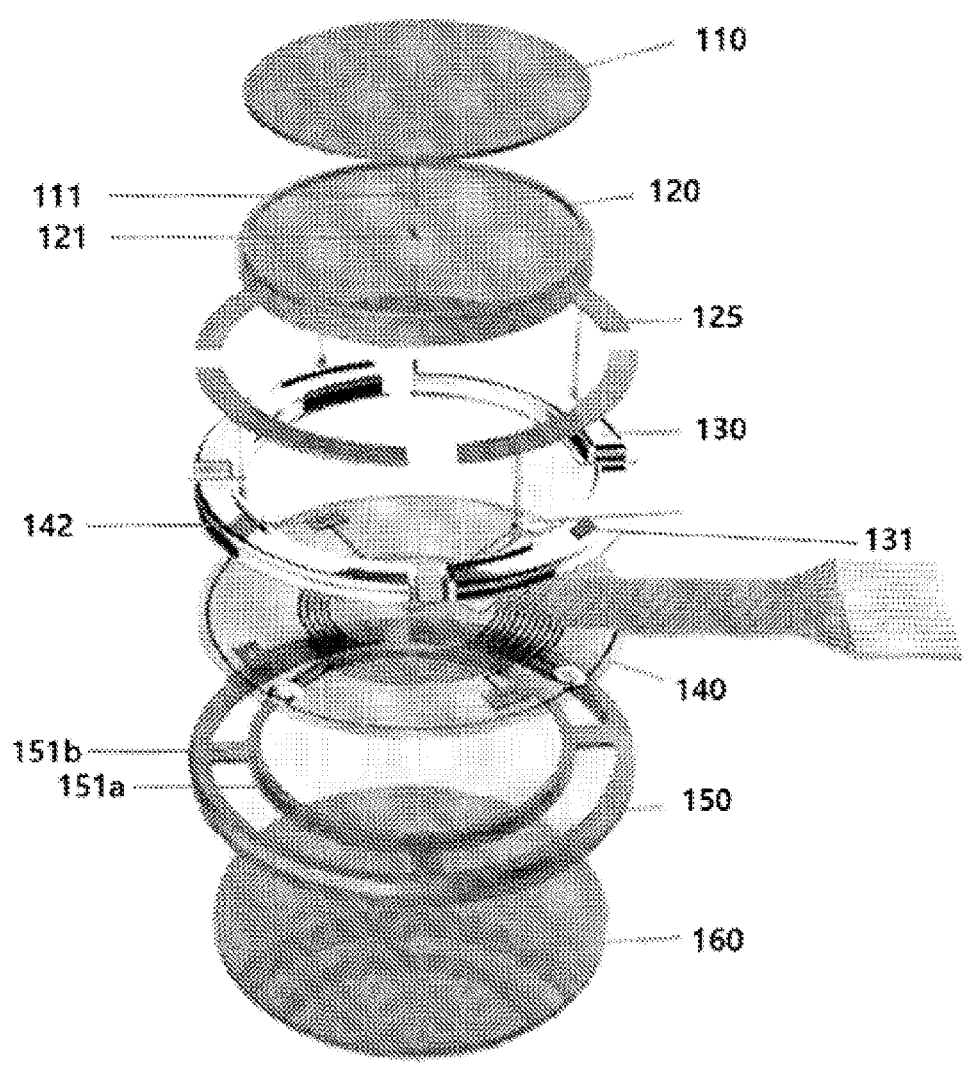
FIG. 6 is an exploded perspective view of a four-dimensional touch pad module of FIG. 5.

First, as illustrated in FIGS. 5 and 6, the center touch pad 110 is formed to have a disk shape and recognizes a pointing coordinate by touching the touch sensor (not illustrated) to perform the pointing.

Next, as illustrated in FIG. 6, the center touch pad housing 120 has a through hole 121 through which a center touch pad wiring line 111 passes in a center area and accommodates the center touch pad 110 to expose an upper portion of the center touch pad 110.

Next, as illustrated in FIGS. 5 and 6, two or more side touch pads 125 are divided to be formed at the outside in an arc shape to be spaced apart from the center touch pad 110.

Here, the center touch pad 110 solely performs the short-distance pointing, but the side touch pads 125a, 125b, 125c, and 125d forms a combination with the center touch pad 110 to perform the long-distance pointing and perform various basic functions of the touch pad and additional functions which are not provided by the touch pad of the related art in parallel.

Specifically, the case of the long-distance pointing is designed such that a touch response sensitivity is stored when the touch reaches the side touch pads 125a, 125b, 125c, and 125d after starting the touch of the center touch pad 110 and the movement continues according to the stored touch response sensitivity even without repeated touches while the touch is maintained after reaching the side touch pads 125a, 125b, 125c, and 125d. Therefore, when the touch is released after reaching a desired pointing coordinate, the long-distance pointing of the desired pointing coordinate is performed.

As descried above, a touch response sensitivity is stored when the touch reaches the side touch pads 125a, 125b, 125c, and 125d after starting the touch of the center touch pad 110 and unlimited movement is allowed according to the stored touch response sensitivity even without repeated touches while the touch is maintained after reaching the side touch pads 125a, 125b, 125c, and 125d so that the long-distance pointing for as long as desired may be efficiently and conveniently performed even with the very small area which is not comparable with the touch pad of the related art.

Next, as illustrated in FIGS. 5 and 6, the side button 130 has a through hole 131 through which the side touch pad wiring line 126 passes and is configured to perform a side button function by pressing the corresponding side touch pad 125a, 125b, 125c, 125d.

Here, the side button 130 is configured to be divided by the second division boundary layer 151b described below into four side buttons corresponding to SBU 132a, SBD 132b, SBL 132c, and SBR 132d, with the same interval.

In the meantime, only one or a specific combination of the center touch pad 110, the side touch pads 125a, 125b, 125c, and 125d, and the side button 130 may faithfully perform various functions such as a basic function as a graphic controller and additional functions.

Figure 7:
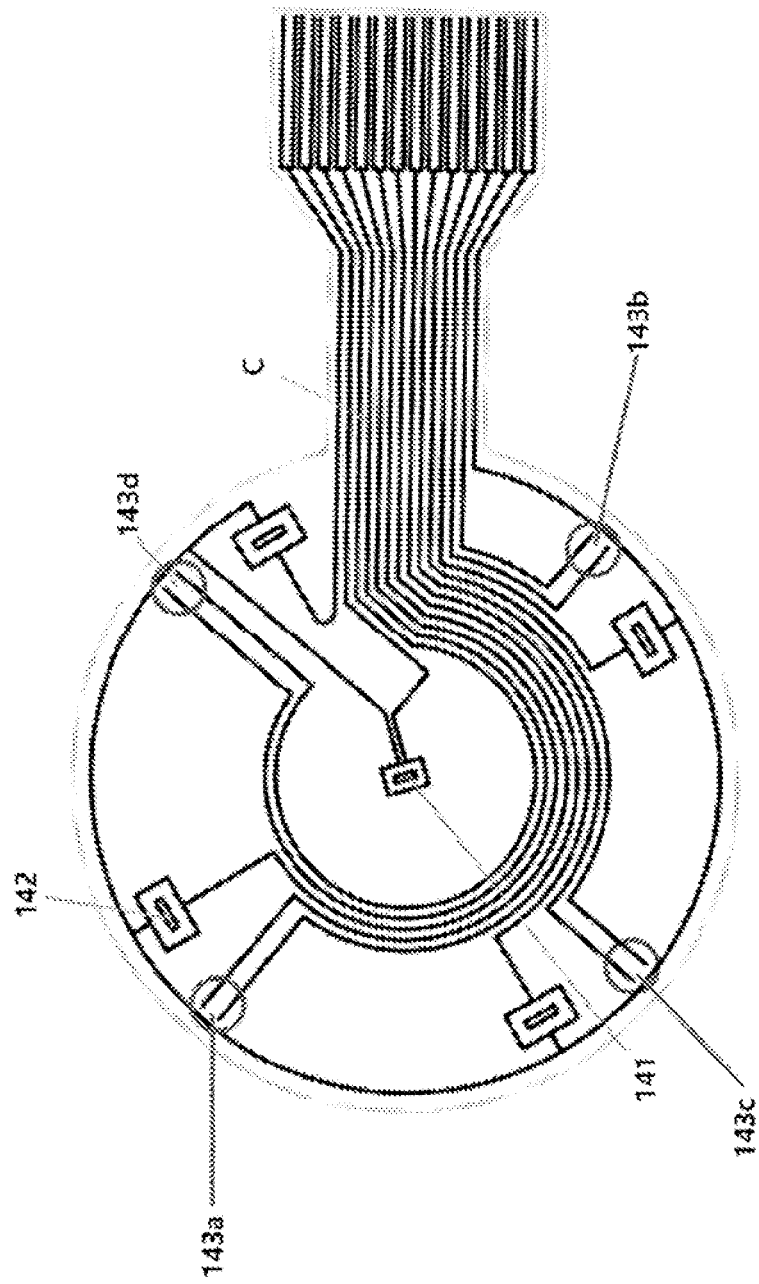
FIG. 7 is a wiring diagram of a FPCB of a four-dimensional touch pad module of FIG. 5.
Figure 8:
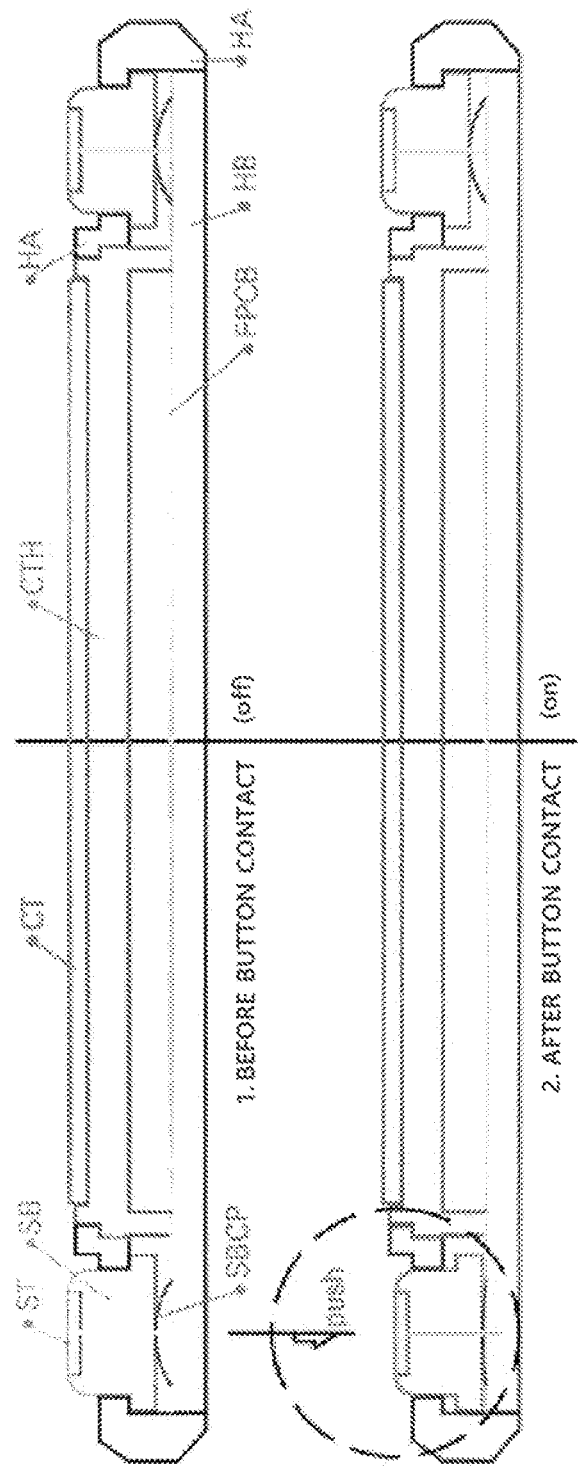
FIG. 8 illustrates a pressurization operation of a side button of a four-dimensional touch pad module of FIG. 5.

Next, as illustrated in FIGS. 6 to 8, in the FPCB 140, a center touch pad FPCB connection part 141 to which the center touch pad wiring line 111 is electrically connected is formed in a center area, a side touch pad FPCB connection part 142 to which the side touch pad wiring line 126 is connected is formed at one side of the outside area, and two or more side button contact points 143 which are radially disposed at the other side of an outside area corresponding to the side button 130 to be electrically connected by pressing the specific side button 130 are formed.

For example, as illustrated in FIG. 7, first to fourth side button contact points 143a, 143b, 143c, and 143d corresponding to the side buttons 130 of SBU 132a, SBD 132b, SBL 132c, and SBR 132d are formed.

Further, as illustrated in FIG. 8, one side button (SB; 132a, 132b, 132c, 132d) is pressed (pushed) to electrically conduct one corresponding side button contact point (SBCP; 143a, 143b, 143c, and 143d) to recognize click, double click, and long press of the side button SB.

Next, as illustrated in FIGS. 5 and 6, the upper housing 150 has a division boundary layer 151 configured by a ring-shaped first division boundary layer 151a which divides the center touch pad 110 and the side touch pads 125a, 125b, 125c, and 125d and a linear second division boundary layer 151b which uniformly and individually divides the side touch pads 125a, 125b, 125c, and 125d in an arc shape, at an upper end.

Further, the lower housing 160 is formed to be opposite to the upper housing 150 and in an inner space of the upper housing (HA, 150) and the lower housing (HB, 160), the center touch pad (CT, 110), the center touch pad housing CTH, the side touch pad (ST, 125a, 125b, 125c, and 125d), the side button (SB, 130), the side button 130, and the FPCB 140 are sequentially laminated to be accommodated. Here, the side touch pads 125a, 125b, 125c, and 125d are configured to be divided by the second division boundary layer 151b into four side touch pads corresponding to STU 125a, STD 125b, STL 125c, and STR 125d, with the same interval.

In the meantime, the division boundary layer 151 is set to have a height of 0.5 mm to 1.0 mm enough to recognize a boundary between the center touch pad 110 and the side touch pads 125a, 125b, 125c, and 125d and easily cross the boundary while touching during the interworking by a specific combination of the center touch pad 110 and the side touch pads 125a, 125b, 125c, and 125d for the long-distance pointing. That is, the division boundary layer 151 divides the touch pad to perform various subdivided functions and allow a user to easily recognize a physical boundary by the first division boundary layer 151a and the second division boundary layer 151b with a sense of touch of a finger to prevent an erroneous operation over a boundary of a selective function set for the center touch pad 110 and each side touch pad 125a, 125b, 125c, 125d.

Further, a circuit line C configured by the center touch pad wiring line 111, the side touch pad wiring line 126, and the side button wiring line 144 may be electrically connected to a connection terminal (not illustrated) of an external device by means of a connection groove (not illustrated) formed at one side of the upper housing 150 or the lower housing 160.

In the meantime, in the four-dimensional touch pad module according to the exemplary embodiment of the present disclosure, a vacuum suction plate or an attachment pad (patch) is formed on a bottom surface of the lower housing 160 to be attached to various remote controllers of a mouse, a smart phone, a smart phone case, a tablet, a notebook computer, or a remote controller, a drone controller, a game controller, and an VR controller to be connected to the circuit line C of the FPCB 140 in a wireless manner by means of the wireless module or in a wired manner to perform the touch pad function.

Alternatively, the four-dimensional touch pad module is embedded in various remote controllers of a mouse, a smart phone, a smart phone case, a tablet, a notebook computer, or a remote controller, a drone controller, a game controller, and a VR controller to be integrally configured without being separately attached to perform the touch pad function. That is, the four-dimensional touch pad module according to the exemplary embodiment of the present disclosure may be configured to be coupled to a mouse of the related art, applied to an ultra-thin flat mouse, an ultra-thin curved mouse, or coupled to a deformed mouse. Further, the four-dimensional touch pad module is applied to an ultra-thin flat mouse which is also used as an employee ID so that during the presentation, the user may carry the touch pad to be used while freely moving, by means of the employee ID.

Figure 9:
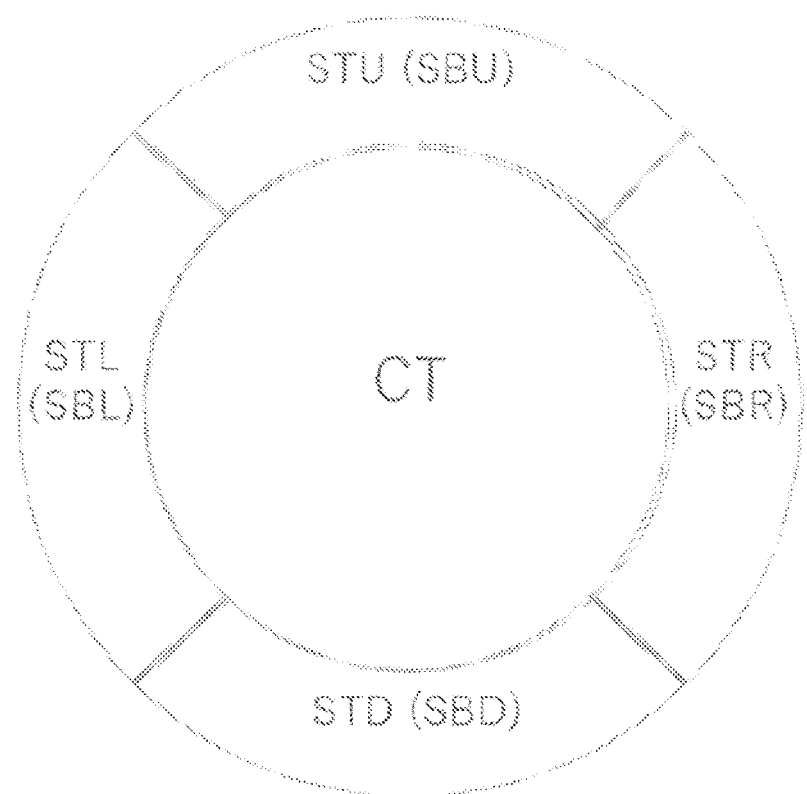
FIG. 9 illustrates a schematic configuration of a touch pad and a side button of a four-dimensional touch pad module according to the first and second exemplary embodiments.

In the meantime, referring to FIG. 9 and Tables 1 to 3, a basic function and various additional functions by a single operation or a combination operation of the center touch pad 110, the side touch pads of STU 125a, STD 125b, STL 125c, and STR 125d, and side buttons 130 of SBU 132a, SBD 132b, SBL 132c, SBR 132d will be described below in detail.

TABLE 1

| Pointing | Short-distance (fine control) | | Long distance | |
|---|---|---|---|---|
| | CT | | CT + ST | |
| Click | Left click | | Right click | |
| | CT, STL, SBL | | STR, SBR | |
| Scroll | Up | Down | Left | Right |
| | STR, STL | | STU, STD | |
| Drag and drop | CT (Double click) + ST | | | |

That is, the right-click function is performed by touch of the STR 125d, up-down scroll is performed by up and down touch of the STL 125c or STR 125d, and left-right scroll is performed by left-right touch of the STU 125a or the STD 125d. short-distance pointing or fine control is performed by touch of the center touch pad 110 and a drag and drop function is performed by a combination of double-click of the center touch pad 110 and side touch pads 125a, 125b, 125c, and 125d. Here, drag and drop is performed such that the pointing is performed after double-click of the center touch pad 110 and when the side touch pads 125a, 125b, 125c, and 125d are touched, the drag is continuously performed while maintaining the touch and the touch is released after reaching a desired coordinate point to perform the drop.

Further, an additional function desired by the user may be set by using the side touch pads 125a, 125b, 125c, and 125d alone or a combination by interworking with the other side button 130 to be performed. At this time, 10 cases including four cases of click or double-click of only one of the side touch pads 125a, 125b, 125c, and 125d and six combinations formed by simultaneous click of a combination of the side touch pads 125a, 125b, 125c, and 126d may be generated. When 10 cases are combined to form a combination with click/double click/long press of the side button 130, the user may arbitrarily set 120 additional functions to perform. Further, as long as the user remembers the set combinations, the user may set not only the function key of the keyboard, but also the function of the keyboard to perform the function. Therefore, as long as the user remembers the set combinations, the user may set not only the function key of the keyboard, but also the function of the keyboard to perform the function.

TABLE 2

| Side button | Operation | Function | Side button | Operation | Function |
|---|---|---|---|---|---|
| SBU | V | Go-back | SBR | V | Right click |
|  | W | Go-home |  | W |  |
|  | ~ | Short cut |  | ~ | Zoom-in |
| SBD | V | Basic setting | SBL | V | Left click |
|  | W | MP/android |  | W | Double click |
|  | ~ | MP/iOS |  | ~ | Zoom-out |

That is, "go-back" is performed by click (v) of the SBU 132*a*, "go-home" is performed by double-click (w) of the SBU 132*a*, and "short cut" is performed by long press (~) of the SBU 132*a*. Mouse basic setting is performed by click of the SBD 132*b*, android is used as a main platform by the double-click of the SBD 132*b*, and iOS is used as a main platform by the long-press of the SBD 132*b*. Right-click is performed by click of the SBR 132*d*, and zoom-in is performed by the long-press of the SBR 132*d* and left-click is performed by click of the SBL 132*c*, double-click is performed by double-click of the SBL 132*c*, and zoom-out is performed by the long-press of the SBL 132*c*.

TABLE 3

| Touch | In use | Photo mode |
|---|---|---|
| CT | Answer phone | Take picture |
| CT Double touch | Hang up | Zoom-in |
| CT long touch | Record | Zoom-out |

That is, in a phone-call mode, the center touch pad 110 is touched to answer the phone, is double-touched to hang up, and is long-pressed to perform the recording. In a photo mode, the center touch pad 110 is touched to take a picture, is double-touched to perform "zoom-in", and is long-touched to perform "zoom-out".

Accordingly, a configuration of the four-dimensional touch pad module of the second exemplary embodiment as described above allows the center touch pad to perform the short-distance pointing alone and a combination of the center touch pad and the side touch pad to perform the long-distance pointing in parallel and enables the pointing function in a fixed space without physical movement to overcome the spatial restriction. Further, various additional functions which are not provided by the touch pad of the related art are provided by a single operation and a combinational operation of the divided touch pads and side buttons. The touch pad is attached without feeling of rejection or difference or embedded in a device itself with various shapes without size limitation to be integrated to be used in a wired manner or a wireless manner. Further, the touch pad is formed to have ultra-thin thickness to be manufactured with a single configuration which is externally combined in association with an overall design of various smart devices to which a touch pad function is applicable.

Therefore, configurations illustrated in the embodiments and the drawings described in the present specification are only the most preferred embodiment of the present invention and do not represent all of the technical spirit of the present invention, and thus it is to be understood that various equivalents and modified examples, which may replace the configurations, are possible when filing the present application.

The invention claimed is:

1. A fourth-dimensional touch pad module, comprising:
a disk-shaped touch pad which recognizes a coordinate to perform pointing;
a division boundary layer which is formed above the touch pad and is configured by a ring-shaped first division boundary layer which divides an upper portion of the touch pad into a circular center touch pad and a side touch pad and a linear second division boundary layer which individually divides the side touch pad in an arc shape;
a side button which has a through hole formed in a center area through which a touch pad wiring line passes and divides an outside area while accommodating the touch pad so as to expose an upper portion of the touch pad to perform a side button function by pressing the side touch pad;
a FPCB which has a touch pad FPCB connection part formed in a center area to which the touch pad wiring line is connected and two or more side button contact points which are radially disposed at an outside area corresponding to the side button to be electrically connected by pressing the side button; and
upper/lower housings in which the division boundary layer, the touch pad, the side button, and the FPCB are sequentially laminated to be accommodated therein,
wherein short-distance pointing is performed only by the center touch pad and long-distance pointing is performed in parallel by a combination of the center touch pad and the side touch pad, in the case of the long-distance pointing, a touch response sensitivity is stored when reaching the corresponding side touch pad after starting the touch of the center touch pad and a movement continues according to the touch response sensitivity without repeatedly touching while the touch is maintained after reaching the side touch pad so that a long-distance pointing of a desired pointing coordinate when the touch is released after reaching the desired pointing coordinate is performed to perform an unlimited long-distance pointing as long as desired even with a very small area of the touch pad.

2. The four-dimensional touch pad module according to claim 1, wherein the side touch pad and the side button are divided by the second division boundary layer into four side touch pads of STU, STD, STL, and STR and four side buttons of SBU, SBD, SBL, and SBR with the same interval, respectively.

3. The four-dimensional touch pad module according to claim 2, wherein various functions of a graphic controller are performed by one or a specific combination of the center touch pad, the side touch pad, and the side button.

4. The four-dimensional touch pad module according to claim 3, wherein the division boundary layer is set to have a height of 0.5 mm to 1.0 mm enough to recognize a boundary and easily cross the boundary while touching during the interworking by a specific combination.

5. The four-dimensional touch pad module according to claim 2, wherein a right click function is performed by touch of the STR.

6. The four-dimensional touch pad module according to claim 2, wherein vertical scrolling is performed by up-down touch of the STL or the STR and horizontal scrolling is performed by left-right touch of the STU or the STD.

7. The four-dimensional touch pad module according to claim 2, wherein the short-distance pointing or fine control is performed by the touch of the center touch pad and a drag and drop function is performed by a combination of a double-click of the center touch pad and the side touch pad.

8. The four-dimensional touch pad module according to claim 2, wherein go-back is performed by click of the SBU, go-home is performed by double-click, and short-cut is performed by long-press, mouse basic setting is performed by click of the SBD, android is used as a main platform by double-click, and iOS is used as a main platform by long-press, right-click is performed by click of the SBR and zoom-in is performed by long-press, left-click is performed by click of the SBL, double-click is performed by double click, and zoom-out is performed by the long-press.

9. The four-dimensional touch pad module according to claim 2, wherein an additional function desired by a user is set by using the side touch pad alone or a combination by interworking with the other side button to be performed and 10 cases including four cases of click or double-click of only the side touch pad and six combinations formed by simultaneous click of the interworking side touch pad are generated, and 10 cases interwork to form a combination of click/double click/long press of the side button to allow the user to arbitrarily set 120 additional functions and remember the set combinations to set a function key of a keyboard and a function of the keyboard to be performed.

10. The four-dimensional touch pad module according to claim 1, wherein a vacuum suction plate or an attachment pad is formed on a bottom surface of the lower housing to be attached to a mouse, a smart phone, a smart phone case, a tablet, a notebook computer, or a remote controller to perform a touch pad function wirelessly or by being connected to a circuit line of the FPCB through a wire.

11. The four-dimensional touch pad module according to claim 10, wherein the four-dimensional pad module is embedded in the mouse, the smart phone, the smart phone case, the tablet, the notebook computer, or the remote controller to be integrally formed to perform a touch pad function.

12. The four-dimensional touch pad module according to claim 11, wherein in a phone-call mode, the center touch pad is touched to answer a phone, is double-touched to hang up, and is long-pressed to perform a recording and in a photo mode, the center touch pad is touched to take a picture, is double-touched to perform zoom-in, and is long-touched to perform zoom-out.

13. A four-dimensional touch pad module, comprising:
a disk-shaped center touch pad which recognizes a coordinate to perform pointing;
a center touch pad housing which has a through hole formed in a center area through which a center touch pad wiring line passes and accommodates the center touch pad so as to expose an upper portion of the center touch pad;
two or more side touch pads which are divided to be formed in an arc shape at an outside to be spaced apart from the center touch pad;
a side button which formed below the side touch pad to correspond thereto, has a through hole through which a side touch pad wiring line passes, and performs a side button function by pressing the side touch pad;
a FPCB which has a center touch pad FPCB connection part formed in a center area to which the center touch pad wiring line is connected, a side touch pad FPCB connection part at one side of an outside area to which the side touch pad wiring line is connected, and two or more side button contact points which are radially disposed at the other side of the outside area corresponding to the side button to be electrically connected by pressing the side button;
an upper housing in which a division boundary layer configured by a ring-shaped first division boundary layer which divides the center touch pad and the side touch pad and a linear second division boundary layer which individually divides the side touch pad in an arc shape is formed at an upper end and the center touch pad, the side touch pad, the center touch pad housing, the side button, and the FPCB are sequentially laminated to be accommodated; and
a lower housing formed to be opposite to the upper housing,
wherein short-distance pointing is performed only by the center touch pad and long-distance pointing is performed in parallel by a combination of the center touch pad and the side touch pad, in the case of the long-distance pointing, a touch response sensitivity is stored when reaching the corresponding side touch pad after starting the touch of the center touch pad and a movement continues according to the touch response sensitivity without repeatedly touching while the touch is maintained after reaching the side touch pad so that the long-distance pointing of a desired pointing coordinate when the touch is released after reaching the desired pointing coordinate is performed to perform an unlimited long-distance pointing as long as desired even with a very small area of the center touch pad.

* * * * *